Figure 1:
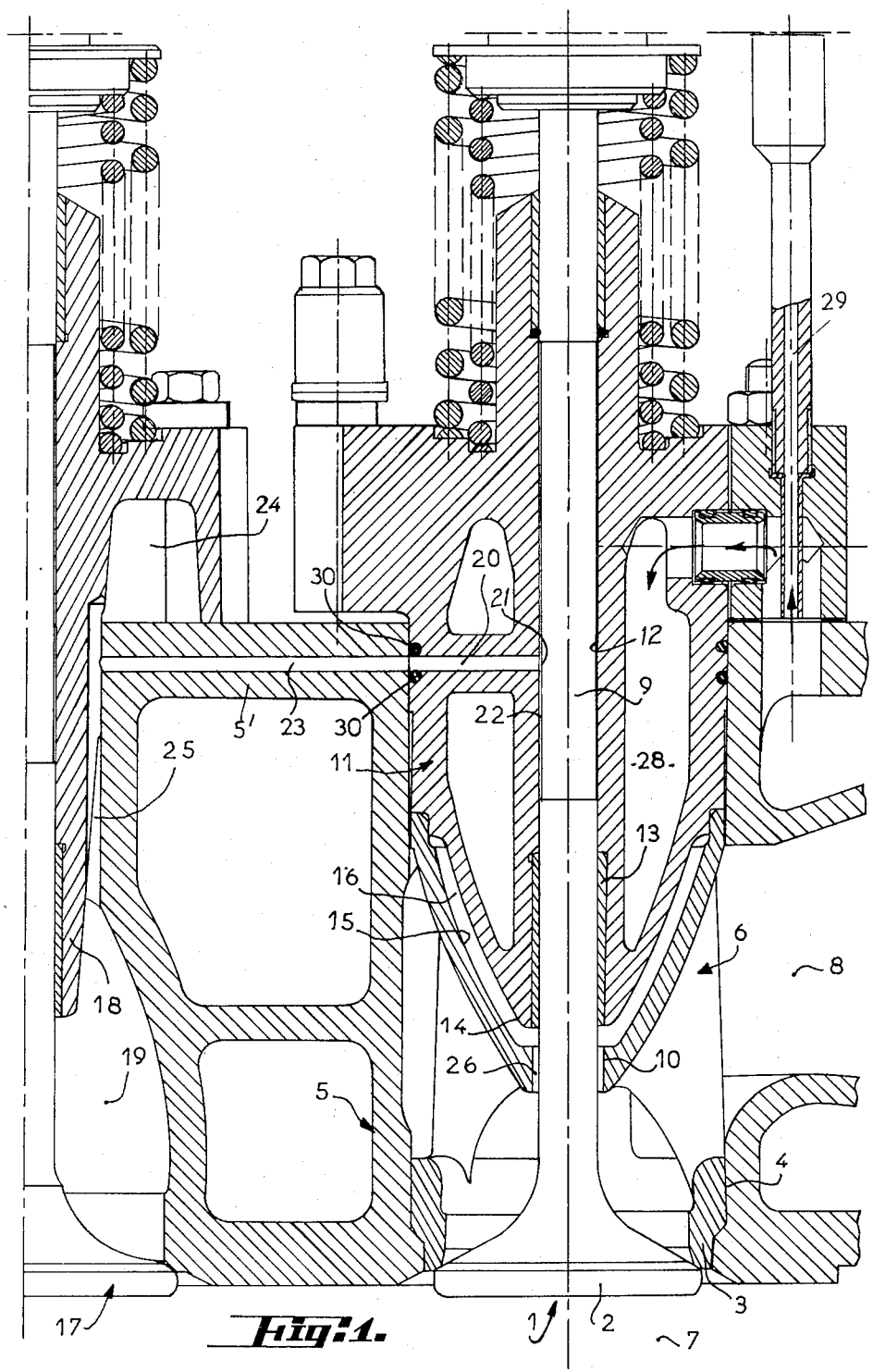

United States Patent [19]
Kuhn

[11] 3,799,139
[45] Mar. 26, 1974

[54] METHOD AND DEVICE FOR PROTECTING THE STEM OF AN EXHAUST VALVE OF AN INTERNAL COMBUSTION ENGINE OR THE LIKE AGAINST CORROSION

[75] Inventor: Karl Walter Kuhn, Saint-Germain-en-Laye, France

[73] Assignee: Societe D'Etudes De Machines Thermiques, Saint-Denis, France

[22] Filed: Sept. 15, 1971

[21] Appl. No.: 180,606

[30] Foreign Application Priority Data
Sept. 23, 1970 France .............................. 70.34420

[52] U.S. Cl. ........................ 123/188 GC, 123/41.85
[51] Int. Cl. ............................................... F01p 3/14
[58] Field of Search........ 123/188 GC, 188 P, 41.85; 277/30, 53

[56] References Cited
UNITED STATES PATENTS

| | | | |
|---|---|---|---|
| 1,712,539 | 5/1929 | Willgoos | 123/188 GC |
| 2,112,045 | 3/1938 | Puffer | 123/188 GC |
| 3,162,185 | 12/1964 | Knoblock | 123/188 P |
| 1,594,517 | 8/1926 | Dufty | 123/188 GC |
| 2,018,372 | 10/1935 | Mason | 277/53 |

FOREIGN PATENTS OR APPLICATIONS

| | | | |
|---|---|---|---|
| 1,121,846 | 5/1956 | France | 123/188 GC |
| 708,198 | 4/1954 | Great Britain | 277/30 |
| 967,274 | 3/1950 | France | 123/188 GC |
| 885,985 | 1/1962 | Great Britain | 123/41.85 |
| 28,943 | 12/1911 | Great Britain | 123/188 GC |

*Primary Examiner*—Laurence M. Goodridge
*Attorney, Agent, or Firm*—Kenyon & Kenyon Reilly Carr & Chapin

[57] ABSTRACT

In a device for protecting an exhaust valve stem of an internal combustion engine against corrosion, auxiliary fluid injection duct means connected to a source of auxiliary gaseous pressure fluid and extending through the valve stem guide to open close to the valve stem into an annular space surrounding the latter and located between the valve disk and the stem area exposed to corrosion.

12 Claims, 2 Drawing Figures

METHOD AND DEVICE FOR PROTECTING THE STEM OF AN EXHAUST VALVE OF AN INTERNAL COMBUSTION ENGINE OR THE LIKE AGAINST CORROSION

The present invention generally relates to and is essentially concerned with a method of protecting the stem or spindle particularly of a cooled exhaust valve of an internal combustion engine or like thermal machine or heat engine against corrosion caused in particular by any leakage of the exhaust gases and a device for carrying out such a method as well as the various applications and utilizations resulting from their use and the systems, assemblies, arrangements, apparatus, appliances, equipments and installations provided with such devices.

It is known that in certain internal combustion engines and in particular in large Diesel engines, the exhaust valves are cooled by means of for example a water flow through forced circulation within the valve stem or spindle. In particular in those Diesel engines which are burning heavy fuel oil containing sulphur, the burnt or exhaust gases contain sulphuric anhydride or trioxide and steam. These gases tend to flow upwards along the valve stem between the latter and the body portion forming the valve stem guide and to reach some point of the valve stem where, due to the forced cooling thereof a temperature about the dew point prevails. This causes the chemical combination of the sulphuric anhydride with the steam to form sulphuric acid that attacks or etches the valve stem within the area where such a temperature about the dew point prevails.

To obviate such a drawback, various protective coatings or linings covering the valve stem and unalterable by sulphuric acid have already been proposed and tested but such a solution did not prove to be entirely satisfactory from the standpoint of behaviour or durability and manufacture (which was complicated and expensive).

A main object of the invention is to remove the aforesaid inconveniences and difficulties by providing a protection against corrosion through the use of an almost perfect sealing means of the controlled play or clearance type, known per se, arranged about the valve stem and adapted to prevent or at least to hinder or impede and to considerably reduce the passage of exhaust gases along the valve stem. For this purpose, the method according to the invention is characterized by the steps consisting in providing at least one auxiliary compressed gaseous fluid ring forming a pneumatic sealing joint or barrier about the valve stem in at least one portion thereof between said stem and a stationary surrounding wall and in dividing, through successive constrictions and expansions within a labyrinth, the exhaust gas leakage generating pressure difference to achieve a pressure cascade with attendant turbulence and pressure or head losses within a confined annular space surrounding said valve stem and located at least partially downstream of said pneumatic joint between the valve disk and that region of said valve stem which is exposed to corrosion.

Thus the penetration or advancing flow of the exhaust gas leakages along the valve stem is opposed by the barrier provided by an auxiliary pressure fluid the inlet velocity or pressure of which should be at least at some point of the system higher than the back-diffusion speed or pressure of the exhaust gas leakages. This process therefore offers the advantage of being extremely simple hence of a very easy use and not very expensive while being very efficient and of a high reliability or operating safety since it solves in an almost perfect manner the technical problem set without producing additional constraints.

Moreover, such an arrangement offers the significant advantage of considerably increasing the efficiency of the protection against corrosion or of preventing same by the combination of two means known per se, namely the pneumatic joint and the labyrinth joint.

According to still another characterizing feature of the invention, which is applicable to a supercharged internal combustion engine, said auxiliary or additive gaseous fluid is compressed air taken from the air for supercharging said engine or delivered by any independent source or supply of compressed air. Such a solution with supercharging air offers the considerable advantage of simplifying the construction to the utmost since the source of auxiliary fluid is already available on the engine and is located near the place of using same.

The invention also relates to a device for carrying out said method, which device is characterized by at least one additive fluid injection or feed duct connected to a source of auxiliary compressed gaseous fluid and extending through the body portion forming the valve stem guide to open in close vicinity of the valve stem into an annular space surrounding same and preferably located between the valve disk and the stem area exposed to corrosion. Such an arrangement is advantageous by the structural simplicity of its construction hence by an economical manufacture and by a reliable and efficient operation.

Figure 2:
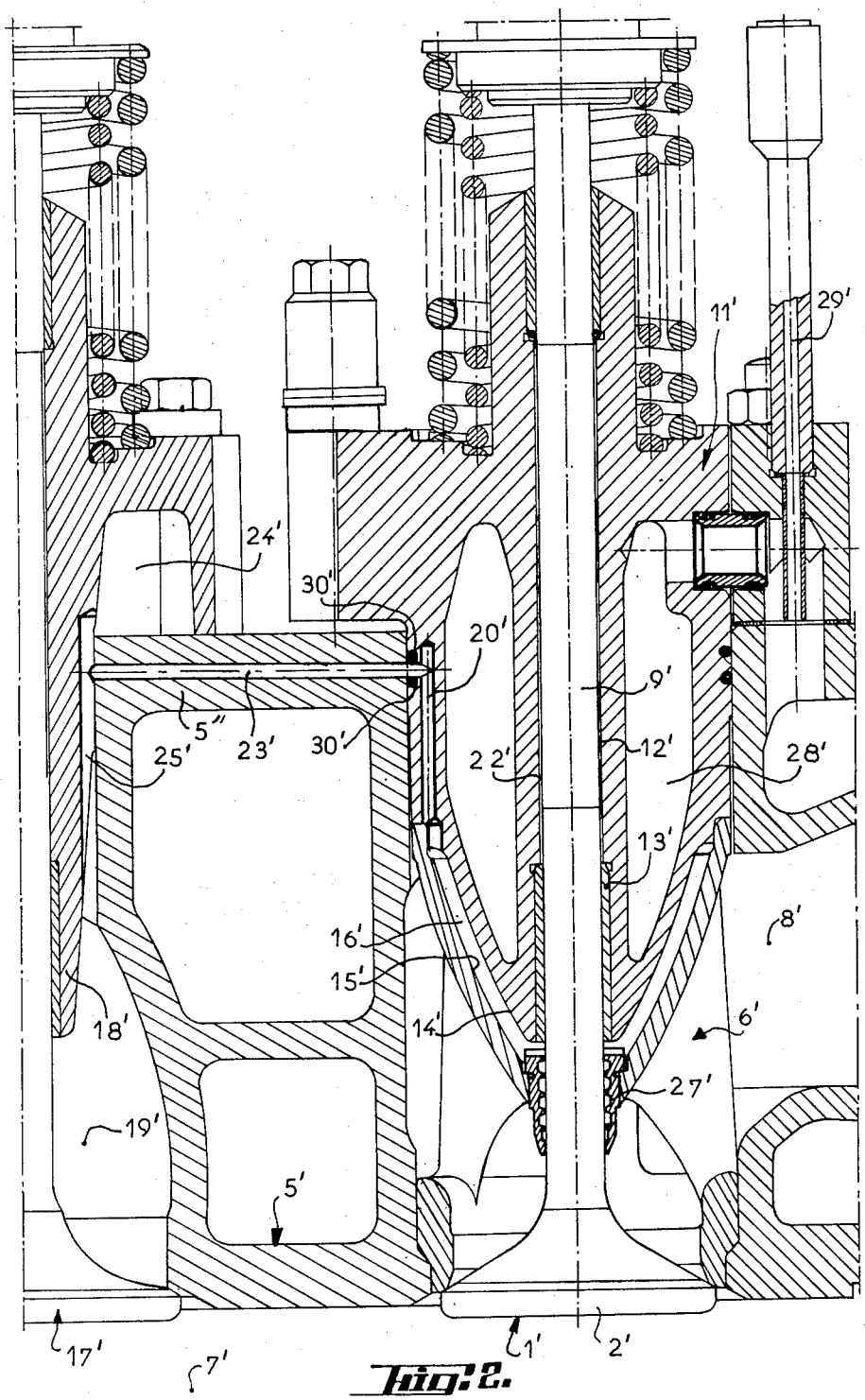

The invention will be better understood and further objects, characteristics, details and advantages thereof will appear more clearly when reading the following explanatory description with reference to the accompanying diagrammatic drawings given by way of examples only illustrating various forms of embodiment of the invention and wherein:

FIG. 1 shows a fragmentary sectional view of a Diesel engine exhaust valve mounted in the cylinder head and provided with a device according to a first embodiment of the invention; and FIG. 2 is a view similar to the preceding one but showing an improved alternative embodiment or modification.

According to the exemplary embodiment shown in FIG. 1, a Diesel engine exhaust valve generally denoted by the reference numeral 1 has its mushroom or poppet-like head or disk 2 engageable with a valve seat 3 fitted into a corresponding bore 4 of the cylinder head 5. The valve seat 3 is integrally formed with a valve cage 6 defining passageways for the hot burnt gases coming from the combustion chamber 7 (not shown) for discharging them away through the exhaust channel 8. The valve stem or spindle 9 extends successively through the hub of the valve cage 6 through a corresponding central hole or bore 10 and the body portion 11 forming the valve stem guide cooled by forced circulation of water within the cavity 28 (fitted within the cylinder head 5) through the central bore 12 thereof wherein is mounted a valve stem guide bushing 13 in sliding engagement with the valve stem 9. The lower end 14 of the body 11 exhibits a substantially convex pointed or ogival shape projecting into the complementary mating hollow or concave portion 15 of the valve cage 6 while desirably leaving an intermediate space 16 between the valve stem guide 11 and the valve cage 6.

At the left-hand side of FIG. 1 is seen substantially one longitudinal half of an inlet valve 17 associated with the exhaust valve 1 and slidably mounted within the valve stem guide 18. This inlet valve 17 is adapted to close and to open the intake channel or chamber 19 opening into the combustion chamber 7.

The exhaust valve 1 is cooled by a forced circulation of water flowing through the hollow or tubular stem 9 of the valve from the piping 29 and which is not shown.

In this example, the device according to the invention comprises at least one additive compressed gaseous fluid injection duct 20 extending through the valve stem guide 11 to open into the bore 12 of this valve stem guide at a level 21 preferably located below that area of the annular space 22 which lies between the valve stem 9 and the bore 12, wherein the temperature corresponding to the dew point prevails. According to the exemplary embodiment shown, the Diesel engine involved is of the supercharged type and said source of auxiliary compressed gaseous fluid consists of the air for supercharging said engine. The duct 20 is therefore connected for example to the supercharging air intake chamber 19 of the associated inlet valve 17 through the medium of a duct 23 extending through the portion 5' of the cylinder head forming a valve box, case or chest and opening for example into a suitable recess 24 of the inlet valve stem guide 18, which recess communicates through an annular space 25 with the intake chamber or channel 19. Sealing joint packings or gaskets 30 between the body 11 and the cylinder head 5 provides for the fluid-tight connection between the ducts 23 and 20.

The operation of this system is the following: the supercharging compressed air, the pressure of which is higher than the average pressure of the exhaust gases and which is delivered by the intake channel 19 by entering the recess 24 through the annular space 25, is delivered to the duct 20 through the duct 23 and enters the annular space 22 surrounding the valve stem 9 to flow in particular downwards towards the valve disk 2 to penetrate through the annular space 26 left between the valve stem and the bore 10 of the valve cage 6 into the exhaust channel 8 to be discharged away thereby. Thus is provided a pneumatic sealing joint forming an air barrier about the valve stem 9 and which, each time the exhaust valve 1 opens, opposes the upward flow of the exhaust gases along the stem 9 or at least prevents them from reaching that area where the temperature corresponding to the dew point prevails.

It should however be noted that at the beginning of each exhaust cycle or stroke, the exhaust pressure is momentarily higher than the compressed air pressure, so that one portion of the exhaust gases manages to flow upwards along the valve stem at the beginning of each exhaust time or stroke.

The improved alternative embodiment according to FIG. 2 wherein parts like those of FIG. 1 are designated by the same reference characters, enables coping efficiently with this slight deficiency by the fact that said air injection duct 20° instead of opening directly into the bore of the valve stem guide 11 opens between that valve stem guide and the adjacent valve cage 6 into the annular space 16 surrounding the valve stem 9 between the end 14 of said valve stem guide and said cage 6, whereas the hub of this valve cage, through which said valve stem extends, comprises a sealing labyrinth joint or the like 27 located within the passageway of said valve stem and consisting for example of a suitable labyrinth-shaped sleeve fastened within the hub of the valve cage 6. The presence of such a sealing labyrinth joint enables the stopping or blocking of the pressure wave of the exhaust gases at the beginning of each exhaust stroke, so that said deficiency is removed thereby.

It should be understood that the invention is not at all limited to the embodiments described and shown which have been given by way of example only. In particular it comprises all the means forming technical equivalents to the means described as well as their combinations if same are carried out according to the gist of the invention as defined in the appended claims.

What is claimed is:

1. An arrangement for an overhead poppet valve, water-cooled internal combustion engine of the reciprocating type having cylinder head means, at least one exhaust valve disk for said head means, an exhaust valve stem for said disk, a valve stem guide including a water jacket in said cylinder head means, said stem extending in slidable engaging relationship through a corresponding bore of said valve stem guide and at least one air feed duct in said cylinder head means connected to a supply source of compressed air having a pressure higher than the average pressure of engine exhaust gases, said exhaust valve stem guide having a confined annular space surrounding said valve stem locally and into which said duct opens whereby the compressed air via said duct is fed into said annular space from said source is caused to flow downwards in said annular space between said exhaust valve stem and said guide towards said valve disk and additional means for providing forced water cooling flow through the jacket of said exhaust valve stem guide for further cooling of said exhaust valve stem, said annular space in said bore being located in the region of said exhaust valve stem where the latter exhibits dew point temperature conditions caused by the inner water cooling of said exhaust valve stem guide.

2. An arrangement according to claim 1, wherein said bore has at least one bearing wall portion in which said exhaust valve stem is in sliding engagement, said bearing wall portion of said bore of said exhaust valve stem guide being located adjacent the bottom end of said exhaust valve stem guide, and said annular space being located in said bore above said bearing portion, said bearing portion being therefore located between said annular space and said exhaust valve disk, said air feed duct opening into said bore at region where said annular space is located.

3. An arrangement according to claim 2, wherein said bearing portion comprises a bushing member fitted into said bore of said exhaust valve stem guide.

4. An arrangement according to claim 1, including at least one intake valve disk having a stem and a corresponding intake valve stem guide for said last-named stem associated with said exhaust valve disk within cylinder head means, said cylinder head means having an intake valve chamber through which supercharging compressed intake air from a supply source flows toward the intake valve disk, said exhaust valve stem guide being tightly fitted in said cylinder head means and said air feed duct being connected in sealing relationship to a passageway leading through said cylinder head means to open into said intake valve chamber which serves as the said supply source of compressed air.

5. An arrangement according to claim 4, wherein said passageway opens into an annular channel surrounding said intake valve stem guide and communicates at its bottom end with said intake valve chamber and at its top end with a recess formed in said intake valve stem guide.

6. An arrangement according to claim 1, including at least one intake valve disk having a stem and corresponding intake valve stem guide for said last-named stem associated with said exhaust valve head within said cylinder head means, said cylinder head means having an intake valve chamber through which supercharging compressed intake air from a supply source flows toward the intake valve disk, said exhaust valve stem guide being tightly fitted in said cylinder head means, and said feed duct being connected in sealing relationship to a passageway leading through said cylinder head means to open into said intake valve chamber which latter serves as the supply source of said compressed air.

7. An arrangement according to claim 6, wherein said passageway opens into an annular channel surrounding said intake valve stem guide and communicates at its bottom end with said intake valve chamber and at its top end with a recess formed in said intake valve stem guide.

8. An arrangement according to claim 1, wherein said exhaust valve stem guide has a bottom end portion, a shield partition member located in said cylinder head means between said bottom end portion and said exhaust valve disk and positioned to define an annular intermediate space between said guide and said shield partition member and into which space said air feed duct opens, said shield partition member having an aperture in coaxial relation to the bore of said exhaust valve stem guide for the free passage of said exhaust valve stem therethrough, said aperture opening into said intermediate space downstream of said air feed duct and a sleeve-like labyrinth sealing joint having successive alternating annular expansion recesses and constrictions located in said aperture, and said exhaust valve stem extending through said joint.

9. An arrangement according to claim 8, wherein said bottom end portion of said exhaust valve stem guide has a substantially convex pointed ogival downward projecting shape and said shield partition member is of complementary hollow curved shape and surrounds said bottom end portion in spaced relationship therewith.

10. An arrangement according to claim 4, wherein said passageway opens into an annular channel surrounding said intake valve stem guide and communicates at its bottom end with said intake valve chamber and at its top end with a recess formed in said intake valve stem guide.

11. An arrangement according to claim 1, including at least one intake disk valve mounted in a corresponding intake valve stem guide and associated with said exhaust valve head within said cylinder head means, said cylinder head means having an intake valve chamber through which said supercharging compressed intake air flows from a source toward the intake valve disk, and wherein said exhaust valve stem guide is tightly fitted in said cylinder head means and said air feed duct is connected in sealing relationship to a passageway leading through said cylinder head means to open into take intake valve chamber which serves as said supply source of compressed air, and a shield partition member secured to and carried by said exhaust valve stem guide.

12. An arrangement according to claim 11, wherein said passageway opens into an annular channel surrounding said intake valve stem guide and communicates at its bottom end with said intake valve chamber and at its top end with a recess formed in said intake valve stem guide.

* * * * *